United States Patent [19]

Hamma et al.

[11] 4,167,853
[45] Sep. 18, 1979

[54] AUTOMATIC CONTROL FOR A HYDROSTATIC VEHICLE TRANSMISSION

[75] Inventors: Karlmann Hamma, Tettnang; Willy Holdenried, Immenstaad; Rudolf Michel, Friedrichshafen, all of Fed. Rep. of Germany

[73] Assignee: Zahnradfabrik Friedrichshafen Aktiengesellschaft, Friedrichshafen, Fed. Rep. of Germany

[21] Appl. No.: 869,235

[22] Filed: Jan. 13, 1978

[30] Foreign Application Priority Data

Jan. 14, 1977 [DE] Fed. Rep. of Germany ....... 2701302

[51] Int. Cl.² .................. F15B 21/04; F16H 39/46
[52] U.S. Cl. ........................ 60/329; 60/464; 60/488
[58] Field of Search ............. 60/329, 456, 464, 465, 60/476, 488

[56] References Cited

U.S. PATENT DOCUMENTS

| | | | |
|---|---|---|---|
| 3,236,049 | 2/1966 | Reinke | 60/464 X |
| 3,850,272 | 11/1974 | Reinke et al. | 60/465 X |

*Primary Examiner*—Edgar W. Geoghegan
*Attorney, Agent, or Firm*—Karl F. Ross

[57] ABSTRACT

An automatic control for an automotive-vehicle hydrostatic transmission in which the engine drives a variable-displacement hydrostatic (axial-piston) pump which is connected with the motor by hydraulic lines. The hydrostatic (axial-piston) motor can be connected to the wheels of the vehicle. The control circuit comprises a filling pump, a metering throttle, a reversing valve and an adjusting device. The metering throttle is provided in a bypass between the filling pump and the reversing valve and is connected to the line communicating with the control element. A further throttle is provided in this line and has a diameter/length ratio less than 1.

8 Claims, 2 Drawing Figures

AUTOMATIC CONTROL FOR A HYDROSTATIC VEHICLE TRANSMISSION

FIELD OF THE INVENTION

The present invention relates to a hydraulic control system for a hydrostatic transmission and, more particularly, to a system for controlling such a transmission using a hydraulically actuated member which adjusts the stroke of a hydrostatic pump.

BACKGROUND OF THE INVENTION

An automotive-vehicle hydrostatic transmission generally comprises an axial-piston pump of the variable-displacement type having a control member which regulates the stroke of the pistons which are displaceable within the respective cylinder barrel and which is generally connected with the crankshaft of the vehicle engine.

The two ports of this hydrostatic pump are connected to the two ports of a hydrostatic (axial-piston) motor whose output shaft is, in turn, connected to a load, usually the driven wheels of the vehicle.

It is known to provide, in connection with such transmissions a hydraulic control circuit which includes a filling pump connected between a reservoir and one of the main hydraulic lines between the variable-displacement pump and the hydrostatic motor, this pump being driven by the engine as well.

Other elements of a control system of this type include a metering throttle, usually in the form of a diaphragm, a reversing or changeover valve which can be automatically controlled to change the transmission ratios by altering the displacement per revolution of the hydrostatic pump.

The throttle diaphragm is connected to a line which forms a bypass connected between the filling pump and the control element of the transmission while the line feeding the latter can also include a so-called feed throttle which need not be of the diaphragm type and is located ahead of a check valve.

Hydrostatic transmissions of this type, especially for automotive vehicles, are usually automatically controlled. This control can be effected by the gas pedal for acceleration and/or by the brake pedal for deceleration and actions by the operator are unnecessary and there is no lag as a result of the intervention of the vehicle operator between the need for varying the transmission ratio and the acceleration or deceleration operation.

In a conventional hydrostatic vehicle transmission, an oil stream at a rate dependent upon the engine speed (RPM), e.g. from a control pump driven by the internal combustion engine, is used for control purposes via a controllable throttle valve.

Ahead of this controllable throttle valve, a speed-responsive signal is obtained which is applied as control pressure for adjusting the displacement of the pump of the transmission.

The signal, in terms of fluid pressure, tapped off ahead of the control throttle is temperature and viscosity dependent so that the controls of such conventional hydrostatic transmissions vary with changes in the viscosity of the fluid and, therefore, the temperature. An ideal, temperature and viscosity insensitive throttle cannot be obtained in practice at low cost.

As a consequence, vehicles controlled in the aforedescribed manner must have their transmissions heated to the desired operating temperature if accurate response to the driving states is to be obtained. When the transmission is cold, even in idling of the engine, a creep is ascertained in the operation of the hydrostatic transmission. When such creep ensues even at low drive torques, when high torques are applied by the engine, considerable risk prevails that the vehicle will jump ahead inadvertently or uncontrollably.

This risk can be diminished by adjusting the drive speed for the cold vehicle. This, however, results in excessive speeds once the vehicle has warmed up.

OBJECT OF THE INVENTION

It is the principal object of the present invention to provide a hydrostatic transmission control system which is capable of regulating the start-up process for the hydrostatic transmission so that upon start-up in a cold state, the start-up speed does not drop below the start-up speed for the warm unit.

SUMMARY OF THE INVENTION

This object and others which will become apparent hereinafter are attained, in accordance with the present invention, in a control system of the type described, i.e. using a filling pump, a metering diaphragm and a switchover valve in which a through-flow throttle is provided between the filling pump and the junction between the switchover valve and the metering diaphragm and is followed by a valve arrangement. The valve arrangement is preferably a pressure-responsive check valve while the through-flow throttle has a diameter/length ratio which is less than one.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
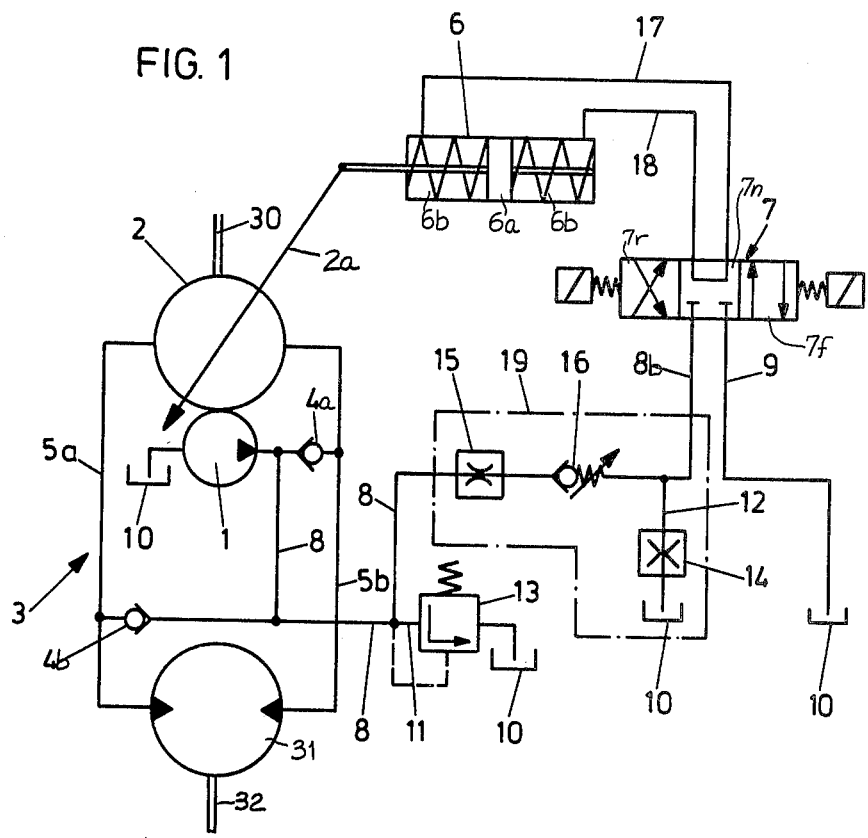
FIG. 1 is a diagram of the control system of the present invention.

In the drawing (FIG. 1) we have shown a hydrostatic transmission which comprises a variable-displacement pump of the axial-piston type (see FIG. 24, Chapter 14, page 14 of MARKS' MECHANICAL ENGINEERS' Handbook, McGraw-Hill Book Co. 1958) which is driven by the crankshaft 30 of the vehicle engine. Hydraulic lines 5a and 5b connect the pump 2 to the ports of the axial-piston motor 31 whose output shaft 32 drives the vehicle wheels. The control system also includes a filling pump 1 which is coupled with the shaft 30 and hence is driven synchronously with the rotatable part of the main pump 2. The filling pump 1 has its intake side communicating with the reservoir 10 while its discharge side is connected via a check valve 4a with line 5b and via a valve 4b and a line 8 with the conduit 5a. The conduits 5a and 5b form the high-pressure circuit of the hydrostatic transmission and whichever of these conduits is at the lower pressure (depending upon the drive conditions of the vehicle), a corresponding flow past one of the check valves from the filling pump 1 can ensue.

The control system also includes an adjusting device 6 in the form of a double-acting cylinder whose piston 6a is centered by springs 6b and which is coupled to the control element 2a of the variable displacement pump 2.

The control device 6 is connected via lines 17 and 18 with a reversing and shut-off valve 7 of the 4-port, 3-position type. In the center position of this valve, lines 17 and 18 are connected together and centering by the springs 6b of the piston 6a is effected. This position has been represented at 7n. In position 7f, the piston 6a is driven to the left and in position 7r, the piston 6a is driven to the right.

The valve 7 is connected by line 8 to the filling pump 1 and by line 9 to the reservoir 10.

The line 8 running from the filling pump 1 to the switchover valve 7 includes a branch 11 which is provided with a pressure-relief or pressure-limiting valve 13 which, upon the development of excess pressure, bypasses the excess to the reservoir 10. The line 8 between the pressure-relief valve 13 and the switchover valve 7 is provided with a through-flow throttle 15 and a pressure-responsive valve 16 in tandem. Between the pressure-responsive valve 16 and valve 17, a metering diaphragm 14 is connected in a branch 17 to the reservoir 10.

Figure 2:
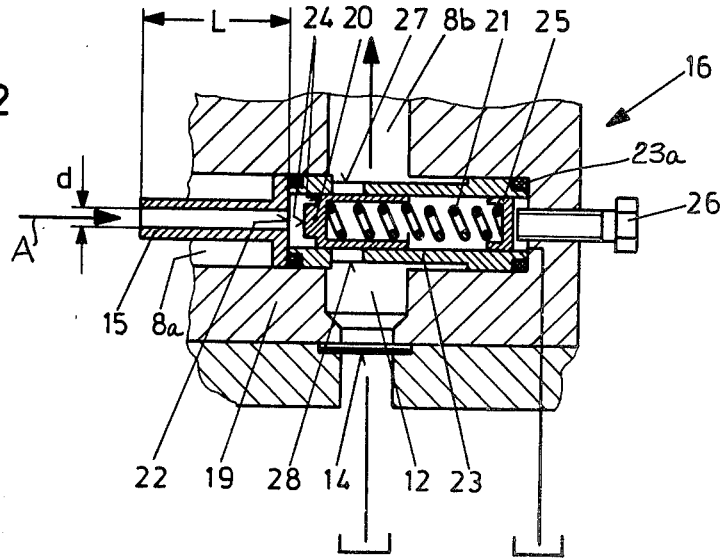
FIG. 2 is an axial cross-sectional view through a combination structure including the through-flow throttle, the pressure-maintaining valve and the metering diaphragm.

FIG. 2 shows the structural details of the through-flow throttle 15, the pressure valve 16 and the diaphragm 14 which are formed as a single unit represented diagrammatically at 19 and included in a common housing.

The piston 20 of the pressure-responsive valve 16 is guided in a sleeve 23 which is fixed in a cylinder bore 8a forming part of the line 8 previously mentioned within the housing 19. O-ring seals 23a are disposed between the housing 19 and the sleeve 23 and the through-flow throttle 15, here shown to be a tubular throttle, is likewise fixed in this bore 8a adjacent the sleeve 23. The piston 20 is axially shaftable is sleeve 23.

The piston 20 is formed as a cup-shaped piston receiving a compression spring 21 which is seated against a plate 25 whose position within the sleeve 23 can be adjusted by a screw 26.

The guide sleeve 23 is provided with a pair of diametrically opposite openings 27 and 28 which, in a predetermined position of the piston 20, form respective control edges with the surface 24 of this piston. In other words, as the piston 20 is moved in the direction of arrow A, the openings 27 and 28 are unblocked and fluid flow to the passage 12 and the diaphragm 14, having a small orifice, is permitted. Flow is also permitted to the passage 8b communicating with the valve 7.

The control system of FIGS. 1 and 2 functions as follows:

The hydraulic fluid (oil) is fed by pump 1 into the otherwise closed circulation path 5a, 5b as required and also through the throttle 15 and the passages 12 and 8b. However, the valve piston 20 is "cracked" only when the pressure of the fluid traversing the throttle 15 is sufficient to overcome the force of spring 21. When this pressure, as set by the screw 26, is exceeded, fluid flow through the diaphragm 14 and to the valve 7 is permitted.

Since the tubular throttle 15 has a diameter/length ratio (d/L)<1.0, the flow of oil is strongly dependent on the viscosity of the oil. For example, with cold oil or hydraulic fluid the pressure drop in the throttle is greater than with warm oil so that the pressure-maintaining valve 16 opens later with cold oil and a cold transmission, i.e. at higher engine RPM. Th start-up speed for shifting the transmission is thus greater with a cold transmission than with the warm machine and the aforedescribed creep does not occur. Valve 7 is controlled to shift the transmission ratio automatically in accordance with conventional practices.

We claim:

1. In a control system for a hydrostatic transmission including a control element for varying the transmission ratio of the transmission, hydraulic control means connected to said element, a switchover valve connected to said hydraulic control means for hydraulically pressurizing and depressurizing same, a filling pump connected to said transmission for feeding hydraulic fluid, thereto, and a hydraulic line connecting said filling pump with said valve to supply fluid to said valve, the improvement which comprises means for maintaining the start-up speed for the transmission in a cold condition thereof above the start-up speed in a warm condition thereof, the latter means comprising in combination:

a through-flow throttle along said line having a diameter/length ratio less than one;

a pressure-actuated valve along said line between said through-flow throttle and said switchover valve and permitting the passage of fluid to said switchover valve only upon the development of a predetermined pressure downstream of said through-flow throttle; and a metering diaphragm connected to said line between said pressure-actuated valve and said switchover valve.

2. The improvement defined in claim 1 wherein said control means is a double-acting hydraulic cylinder having a piston, said hydrostatic transmission includes a variable-displacement pump controlled by said piston and a hydrostatic motor connected to said variable displacement pump, said filling pump being connected with said variable displacement pump for joint rotation therewith.

3. The improvement defined in claim 2 wherein said variable displacement is connected to said motor by a pair of conduits, said filling pump being connected to each of said conduits via respective check valves.

4. The improvement defined in claim 3, further comprising a pressure-limiting valve connected to said line between said through-flow throttle and said filling pump.

5. The improvement defined in claim 4 wherein said through-flow throttle, said pressure-actuated valve and said diaphragm are provided in a common housing.

6. The improvement defined in claim 5 wherein said housing is formed with a bore, said through-flow throttle is a tube received in said bore, and said pressure-actuated valve includes a sleeve fixed in said bore and provided with openings communicating respectively with said switchover valve and said diaphragm, and a valve piston shiftable in said sleeve and unblocking said openings upon the development of a predetermined pressure between said through-flow throttle and said valve piston.

7. The improvement defined in claim 6, further comprising a spring received in said sleeve and biasing said valve piston in the direction of said tube.

8. The improvement defined in claim 7, further comprising adjusting means in said housing for varying the force applied by said spring to said valve piston.

* * * * *